United States Patent
Jatavallabhula et al.

(10) Patent No.: US 10,142,814 B2
(45) Date of Patent: Nov. 27, 2018

(54) EMERGENCY COMMUNICATION SYSTEM AND METHODS THEREFOR

(71) Applicant: Motorola Mobility LLC, Chicago, IL (US)

(72) Inventors: Nagavali Jatavallabhula, Karnataka (IN); Prasanth Nvs, Andhra Pradesh (IN); Vineet Shukla, Azamgarh (IN); Karthik Talloju, Andhra Pradesh (IN)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/664,079

(22) Filed: Mar. 20, 2015

(65) Prior Publication Data

US 2015/0271655 A1    Sep. 24, 2015

(30) Foreign Application Priority Data

Mar. 22, 2014   (IN) ............................. 834/DEL/2014

(51) Int. Cl.
*H04W 4/22*    (2009.01)

(52) U.S. Cl.
CPC ..................... *H04W 4/22* (2013.01)

(58) Field of Classification Search
CPC ........ H04W 4/22; H04W 48/04; H04W 4/021
See application file for complete search history.

(56) References Cited

U.S. PATENT DOCUMENTS

| | | | | |
|---|---|---|---|---|
| 2006/0128355 A1* | 6/2006 | Aaron | ................... | H04M 3/5116 455/404.1 |
| 2010/0159871 A1* | 6/2010 | Tester | ..................... | H04W 4/02 455/404.2 |
| 2011/0281544 A1* | 11/2011 | Pallota | .............. | H04M 1/72577 455/404.1 |
| 2012/0115430 A1* | 5/2012 | Hawkes | ............ | H04M 1/72536 455/404.1 |
| 2013/0344842 A1* | 12/2013 | McDonald | ............ | H04W 4/028 455/404.2 |
| 2014/0323106 A1* | 10/2014 | Nunally | ................. | G06Q 50/01 455/414.1 |
| 2015/0111524 A1* | 4/2015 | South | ...................... | H04W 4/22 455/404.2 |

* cited by examiner

*Primary Examiner* — Olumide T Ajibade Akonai
*Assistant Examiner* — Eboni Hughes
(74) *Attorney, Agent, or Firm* — Faegre Baker Daniels LLP

(57) ABSTRACT

A system includes a server complex and one or more mobile communication devices in communication with the server complex. The server complex includes one or more processors to define one or more elevated safety risk regions within a communication network. The server complex can optionally detect when a mobile communication device enters an elevated safety risk region and place the mobile communication device into an emergency mode of operation.

25 Claims, 7 Drawing Sheets

EMERGENCY COMMUNICATION SYSTEM AND METHODS THEREFOR

BACKGROUND

Technical Field

This disclosure relates generally to systems, and more particularly to communication systems for electronic devices.

Background Art

Personal security is a primary concern for most people. When emergencies arise, people generally call for help by dialing "911" or other numbers to contact emergency personnel. There are situations, however, where making a telephone call to such personnel is impractical or impossible. The severity or type of emergency may simply not lend itself to making telephone calls. Illustrating by example, when a person is injured in an emergency situation they may not be able to verbalize the situation to responders via a telephone call. Additionally, in dangerous situations such as a kidnapping or armed robbery it may not be possible or desirable for a person to verbalize the condition on the phone. It would be advantageous to have an improved emergency system.

Figure 1:
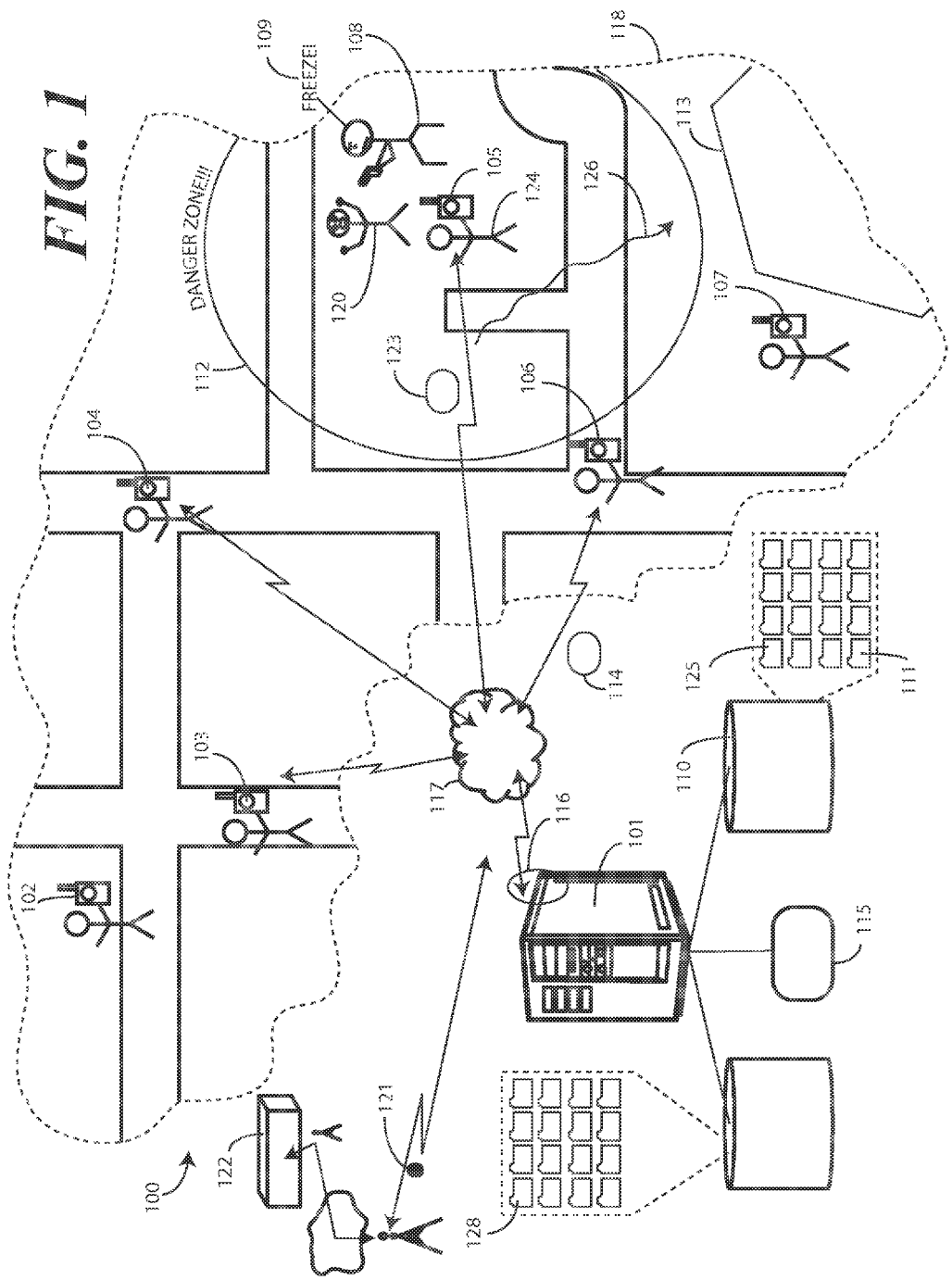
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to an emergency system, a server complex, and/or a mobile communication device. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of the emergency system, the server complex, and/or the mobile communication device(s) described herein. The non-processor circuits may include, but are not limited to, a radio receiver, a radio transmitter, signal drivers, clock circuits, power source circuits, and user input devices. As such, these functions may be interpreted as steps of a method to perform operation of a server complex and/or mobile communication device as described below. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Turning now to FIG. 1, illustrated therein is one explanatory system 100 configured in accordance with one or more embodiments of the disclosure. Embodiments of the disclosure provide an infrastructure or electronic architectural framework that provides an end-to-end solution to enhance the safety of users. In one embodiment, the system includes two primary components: a server complex 101 and one or more mobile communication devices 102,103,104,105,106, 107.

In one embodiment, the mobile communication devices 102,103,104,105,106,107 can operate in a normal mode of operation or a "safety" or "emergency" mode of operation. For example, in FIG. 1 mobile communication device 103 is operating in the normal mode of operation while mobile communication device 105 is operating in the emergency mode of operation. When in the emergency mode of operation, several actions can occur. For example, in one embodiment the display of the mobile communication device 105 turns OFF and the buttons or other control devices are deactivated. Advantageously, this makes the mobile communication device 105 look "dead" or OFF to, for example, an attacker 108. At the same time, audio recording circuitry can be activated to capture some—or all—of the nearby audio sounds 109 for transmission to the server complex 101. Where the mobile communication device 105 is sufficiently exposed such that a camera or video recorder is able to capture action about the scene, nearby video or still images can be captured for transmission to the server complex 101. Other actions can occur, as will be described below with reference to FIG. 6.

In one or more embodiments, the server complex 101 includes a database 110 or other storage data of incidents 111 reported from the network of mobile communication devices 102,103,104,105,106,107. From this information, the server complex 101 can define one or more unsafe, dangerous, or elevated risk zones referred to as elevated safety risk regions 112,113 or areas. From these regions or areas, the server complex 101 can warn users by sending electronic notifications 114 via messaging or other communication techniques that they are entering an elevated safety risk region 112. Optionally, the server complex 101 can automatically place a mobile communication device 105 in an emergency mode of operation when that mobile communication device 105 enters an elevated safety risk region 112. Further, in other embodiments the server complex 101 can use its knowledge of the elevated safety risk regions 112,113 to provide suggestions to the mobile communication device 105 or safe routes through or around the elevated safety risk regions 112,113.

In one or more embodiments, the elevated safety risk regions 112,113 can be defined not only in terms of geography, but also as a function of time. For example, a particular geography can be an elevated safety risk region 113 only at certain times of the day. During the daytime, a particular geographic area may be perfectly safe due to high numbers of pedestrians, increased police presence, and so forth. However, when all these people go home at night, and gangs emerge from the shadows, the same geographic region can become an elevated safety risk region 113. Thus, in one or more embodiments the elevated safety risk regions 112, 113 are defined by a function of both geography and time.

In one or more embodiments, the server complex 101 includes one or more processors 115 that are operable with one or more memory devices, such as database 110, and one or more communication devices 116. The processors 115 can communicate across one or more networks 117 with one or more mobile communication devices 102,103,104,105,106, 107 through the communication devices 116 at the server complex 101.

In one embodiment, the server complex 101 can receive, through the communication device 116, instances of activation of an emergency mode of operation from the mobile communication devices 102,103,104,105,106,107 operating in a communication network 118 with which it is communicating. The server complex 101 can also receive instances of deactivation of the emergency mode of operation from the mobile communication devices 102,103,104,105,106,107. From this information, the server complex 101 can cluster the instances of emergency mode activation and the instances of emergency mode deactivation to define one or more elevated safety risk regions 112,113 within the communication network 118.

In one embodiment, when the server complex 101 detects a mobile communication device 105 entering an elevated safety risk region 112, the server complex 101 automatically places the mobile communication device 105 in the emergency mode of operation. In other embodiments, a user 119 may manually place a mobile communication device 107 in the emergency mode of operation. This manual entry can be by various methods, including pressing a button for a predetermined amount of time, by giving a voice command, or other techniques that will be described below with reference to FIG. 6. The user 119 may place their mobile communication device 107 in the emergency mode of operation, for example, when they feel threatened, at risk, or unsafe. The server complex 101 can detect these user-initiated emergency mode activations to refine and better define the elevated safety risk regions 112,113.

In one or more embodiments, the server complex 101 can detect an emergency incident 120 from a mobile communication device 105. The server complex 101 can then transmit an emergency notification 121 in response to detecting the emergency incident. The emergency notification 121 can be sent to any of a variety of third parties 122. Examples include friends, emergency contacts, first responders, persons listed in a contact list of the mobile communication device 105, emergency personnel, or combinations thereof.

In one or more embodiments, the server complex 101 can monitor a mobile communication device 105 while in an elevated safety risk region 112. The monitoring can occur in any of a variety of ways. For example, the server complex 101 may conduct electronic communication with the mobile communication device 105. The server complex 101 may receive electronic messages 123 from the mobile communication device 105 that include location information, captured audio, captured video, captured still images, timestamp information, motion information received from one or more motion detectors of the mobile communication device 105, biometric information about the user 124, or other types of information.

In one or more embodiments, the electronic messages 123 each include both timestamp information and geographic location information. Timestamp information can assist third parties 122 in determining when events occurred. Geographic location information can help third parties 122 determine where events occurred. When multiple electronic messages 123 are received at the server complex 101, timestamp information can assist third parties 122 in determining in what order they were received. When multiple electronic messages 123 are received at the server complex 101, geographic location information can assist third parties 122 in determining whether the mobile communication device 105 moved between transmissions.

In one embodiment, the server complex 101 monitors the mobile communication device 105 by detecting its motion through an elevated safety risk region 112. The server complex 101 can compare the monitored motion of the mobile communication device 105 through the elevated safety risk region 112 to a predicted motion. Advantageously, in one or more embodiments the server complex 101 can autonomously detect emergency events when the motion of the mobile communication device 105 through the elevated safety risk region 112 differs from the predicted motion by at least a predetermined threshold. Where this occurs, the server complex 101 can notify the third parties 122 as described above.

Illustrating by example, when a user 124 is walking through an elevated safety risk region 112, a sudden change in velocity can indicate that something bad has happened. A sudden increase in velocity may mean the user 124 is running from an attacker 108. A sudden decrease in velocity may mean the user 124 dropped their mobile communication device 105 or has become incapacitated. Accordingly, in one or more embodiments the server complex 101 is to send an emergency notification 121 to a third party when the motion of the mobile communication device 105 through the elevated safety risk region 112 differs from the predicted motion by at least a predetermined threshold.

In one or more embodiments, the predicted motion is based upon a rate of movement that the mobile communication device 105 experienced prior to entering the elevated safety risk region 112. Thus, if the user 124 was walking when entering the elevated safety risk region 112, the server complex 101 may expect the user 124 to continue walking through the elevated safety risk region 112. If this expectation is not met, the server complex 101 may conclude an emergency situation has occurred.

As an alternative to the deviation of predicted motion, in another embodiment the server complex 101 can receive motion information from the mobile communication device 105 while it is in the emergency mode of operation. This information can be received from an accelerometer or gyroscope as will be described in more detail with reference to FIG. 3. If, for example, motion corresponding to the mobile communication device 105 being thrown or hitting the ground is detected, the server complex 101 may conclude that this indicates an emergency event has transpired. The user 124, understanding this, may use this detection mode to an advantage. If, for example, an attacker 108 tries to kidnap the user 124, the user may suddenly throw the mobile communication device 105 while in the emergency mode of operation to alert the server complex 101 that an emergency is occurring.

In one or more embodiments, the server complex 101 can listen, through the communication device 116, to emergency alerts being transmitted by a mobile communication device 105. For instance, the mobile communication device 105 may transmit electronic messages 123 via a messaging protocol. In one or more embodiments, the server complex 101 can then fetch emergency contacts 125 corresponding to the user 124 of the mobile communication device 105. The server complex 101 can then initiate communication with the emergency contacts 125 to alert those emergency contacts 125 to the fact that an emergency may be occurring. In one or more embodiments, the server complex 101 prioritizes the emergency contacts 125 by a particular criteria or criterion. For example, the server complex 101 may prioritize the emergency contacts 125 based upon proximity to the user 124, so as to contact those contacts closest to the user 124 first. In addition, emergency personnel such as police officers may be always regarded as high priority in one or more embodiments.

When an emergency incident occurs, those incidents 111 can be stored in the database 110. The incidents 111 can be used to raise emergency alerts, provide periodic updates relating to the emergency, track incidents 111 in a particular area, and so forth. In one or more embodiments, the emergency notification 121 sent to emergency personnel is populated with a uniform resource locator that links to the database 110 via a webpage or other portal. Advantageously, the emergency personnel or other third party 122 can view information relating to the incident and review the trail of events since the mobile communication device 105 entered the elevated safety risk region 112, triggered an emergency alert, and so forth. In one or more embodiments, the uniform resource locator allows the third party 122 to review timestamp information stored with the incident in the database 110, listen to live audio recordings being transmitted from the mobile communication device 105 to the server complex 101, review live video recordings being transmitted from the mobile communication device 105, review still images being transmitted from the mobile communication device 105, review geographic location information that can, in one or more embodiments, be superimposed on a map. This information stored with the incident in the database 110, which can be accessible through the uniform resource locator, can assist emergency personnel in analyzing the situation and providing help. Moreover, it allows the emergency personnel to easily track movement of the user 124.

As more users register for the service, the server complex 101 can further refine its elevated safety risk region definitions 128. For example, boundaries of the elevated safety risk regions 112,113 may be defined by activation and deactivation of the emergency mode of operation. In one or more embodiments, the server complex 101 clusters these incidents and uses them to define boundaries of the elevated safety risk regions 112,113. For example, the server complex 101 can perform iterative clustering operations on a continual basis to micro-level data points defined by activation and deactivation of the emergency mode of operation. The clustering analysis occurring in the server complex 101 can analyze these micro-level data points relate activation and deactivation of the emergency mode of operation to a boundary to define an elevated safety risk region 112.

In addition to defining boundaries of the elevated safety risk regions 112,113, the server complex 101 can use knowledge of emergency incidents 120 to define safe paths 126 through and/or around elevated safety risk regions 112,113. For example, if a particular street corner is known to be notorious for muggings as determined by the server complex 101 from incidents of emergency situations, the server complex 101 may suggest a safe path 126 around that corner for users 124 traveling within the elevated safety risk region 112. In one or more embodiments, electronic notifications 114 in the form of warnings sent to mobile communication devices 106 entering an elevated safety risk region 112 can include indicia of notorious areas on a map.

In one or more embodiments, mass emergencies can be detected. For example, the server complex 101 can conclude that a mass emergency has occurred based upon a number of users in a particular area that are issuing emergency notifications exceeding a predetermined threshold. Where an emergency affects a lot of people, such as in the case of a natural calamity, earthquake, terrorist attach, train accident, riot, and so forth, the server complex 101 will receive a large number of emergency notifications from a concentrated area. In one or more embodiments, the server complex 101 can determine this is indicative of a mass emergency. Accordingly, the server complex 101 can map coordinates for the mass emergency for emergency personnel. In one or more embodiments, mass emergency notifications can be directed through the network 117 to alert people in that area. Mass emergency notifications can also assist emergency response teams and emergency warning systems.

Figure 2:
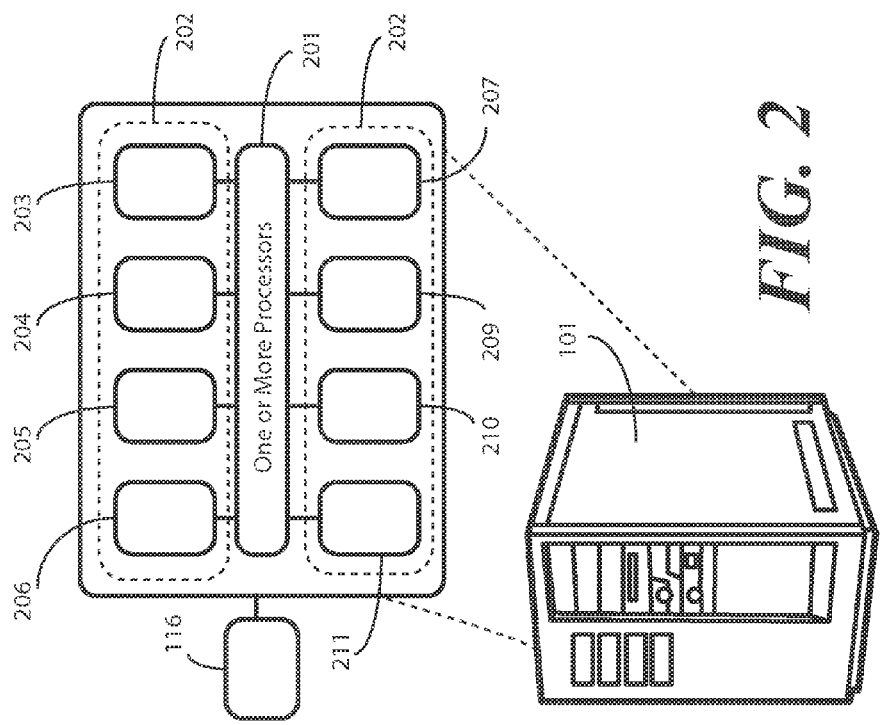
FIG. 2 illustrates one explanatory server complex in accordance with one or more embodiments of the disclosure.

Turning now to FIG. 2, illustrated therein is one embodiment of a server complex 101 suitable for use with one or more embodiments of the disclosure. As noted, the server complex 101 may include one or more processors 201. The one or more processors 201 may be operable with one or more memory devices 202. The one or more processors 201 may be operable with a communication device 116 for communication across a network (117).

The one or more memory devices 202 can be used to store various types of information, including incident information 203, elevated safety risk region definitions 204, safe route definitions 205, emergency contact information 206, timestamp information 207, captured audio information 208, and other information 209, including video information and still image information, as described above. Additionally, the one or more memory devices 202 can hold identification information 210 that allows the one or more processors 201 to identify, for example, an attacker (108) or a user (124) by comparing the captured audio information 208 with the identification information 210 in a voice identification process. In another embodiment, where multiple emergency messages are received from multiple mobile communication devices, the one or more memory devices 202 can audio information 208 from different devices. The one or more processors 201 can compare this audio information across calls, messages or sources to identify, for example, whether a common attacker (108) is appearing in each call or message by comparing the captured audio information 208 with the identification information 210 in a voice identification process, or alternatively whether the attacker (108) has comrades in arms in a gang or other organization. Uniform resource locator definitions 211 can be stored as well to allow emergency personnel or other third parties (122) to gain access to the information stored in the one or more memory devices 202.

In one or more embodiments, the one or more processors 201 can transmit information to one or more mobile communication devices through the communication device 116. Further, the one or more processors 201 can receive, query, and optionally store in the one or more memory devices 202, information from one or more mobile communication devices through the communication device (116).

Figure 3:
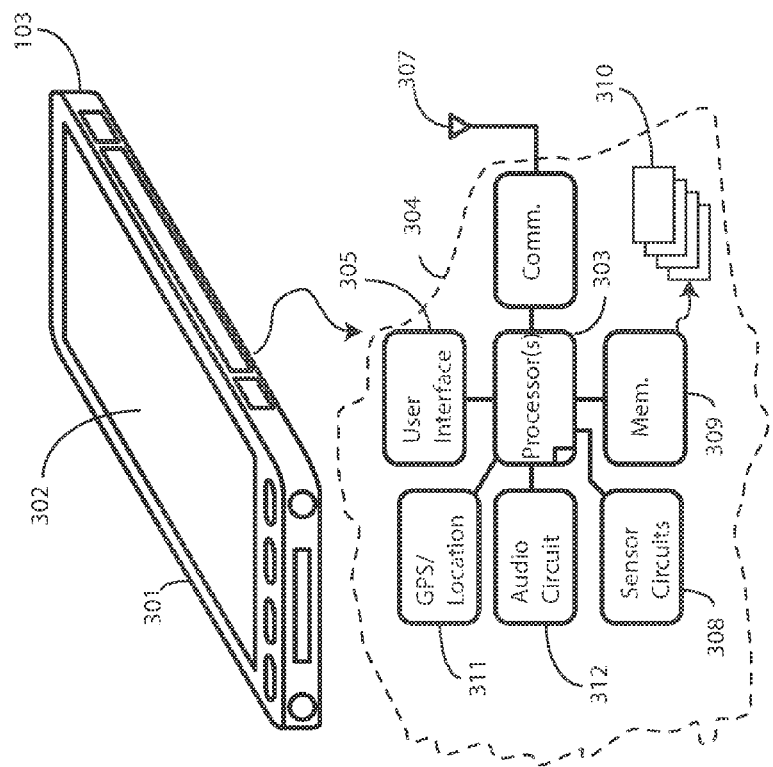
FIG. 3 illustrates one explanatory mobile communication device in accordance with one or more embodiments of the disclosure.

Turning now to FIG. 3, illustrated therein is one explanatory mobile communication device 103 configured in accordance with one or more embodiments of the disclosure. The explanatory mobile communication device 103 is shown as a smart phone for ease of illustration. However, it will be obvious to those of ordinary skill in the art having the benefit of this disclosure that other portable electronic devices may be substituted for the explanatory smart phone as noted above. The mobile communication device 103 may be configured as a palm-top computer, a tablet computer, a gaming device, wearable computer, a remote controller, a media player, laptop computer, portable computer, or other electronic device.

The mobile communication device 103 includes a housing 301. In one embodiment, a display 302 is disposed along the front surface of the housing 301 of the mobile communication device 103. In one embodiment, the display 302 is configured to provide visual output, images, or other visible indicia to a user. In one embodiment, the display 302 comprises an organic light emitting diode (OLED) device.

In one embodiment, the display 302 comprises a touch sensor to form touch sensitive display configured to receive user input across the surface of the display 302. The display 302 can also be configured with a force sensor. Where configured with both a touch sensor and force sensor, one or more processors 303 of the mobile communication device 103, operable with the touch sensor and the force sensor, can determine not only where the user contacts the display 302, but also how much force the user employs in contacting the display 302.

In FIG. 3, the explanatory mobile communication device 103 is shown illustratively with a schematic block diagram 304. The schematic block diagram 304 illustrates various components and modules suitable for inclusion in the mobile communication device 103. It will be clear to those of ordinary skill in the art having the benefit of this disclosure that the components and modules can be used in different combinations, with some components and modules included and others omitted.

In this embodiment, the mobile communication device 103 includes a user interface 305, which can include the display 302. The illustrative mobile communication device 103 also includes a communication circuit 306 that can be configured for wired or wireless communication with one or more other devices or networks such as network (117) from FIG. 1. The networks can include a wide area network, such as a Code Division Multiple Access (CDMA) network, a Global System for Mobile communication (GSM) network, a Push-to-Talk (PTT) network, Dual Band Universal Mobile Telecommunications System (UMTS) networks, and direct communication networks. Alternatively, the network can be a local area network or personal area network as well. The communication circuit 306 can include wireless communication circuitry, one of a receiver, a transmitter, or transceiver, and one or more antennas 307.

The mobile communication device 103 includes one or more processors 303, which can have one or more control circuits. The one or more processors 303 are responsible for performing the various functions of the device. The one or more processors 303 can be a microprocessor, a group of processing components, one or more Application Specific Integrated Circuits (ASICs), programmable logic, or other type of processing device. The one or more processors 303 can be operable with the user interface 305 and the communication circuit 306, as well as various sensors 308 that can be coupled to the one or more processors 303 via interface connections.

The one or more processors 303 can be configured to process and execute executable software code to perform the various functions of the mobile communication device 103. A storage device, such as memory 309, stores the executable software code used by the one or more processors 303 for device operation. The executable software code used by the one or more processors 303 can be configured as one or more modules 310 that are operable with the one or more processors 303. Such modules 310 can store instructions, control algorithms, and so forth. The instructions can instruct processors or one or more processors 303 to perform the various steps, emergency mode of operation, and methods described below.

One or more sensors 308 can be operable with the one or more processors 303. These sensors 308 can include, in any combination, a light sensor, an infrared sensor, a motion sensor, and optionally biometric sensors.

A light sensor, where included, can detect changes in optical intensity, color, light, or shadow in the near vicinity of the mobile communication device 103. The light sensor can be configured as an image-sensing device that captures successive images about the device and compares luminous intensity, color, or other spatial variations between images to detect motion or the presence of an object near the mobile communication device 103. Such sensors can be useful in determining at which side of the mobile communication device 103 a user is standing. The one or more processors can use this information when recording audio, video, or still images during an emergency situation by beam steering the audio capture circuit 312 to more accurately capture audio information. An infrared sensor can be used in conjunction with, or in place of, the light sensor. The infrared sensor can be configured to operate in a similar manner, but on the basis of infrared radiation rather than visible light.

A motion sensor can be included to detect motion of the mobile communication device 103. In one embodiment, the motion sensor includes an accelerometer. The accelerometer can also be used to determine the spatial orientation of the mobile communication device 103 in three-dimensional space by detecting a gravitational direction. In addition to, or instead of, the accelerometer, an electronic compass can be included to detect the spatial orientation of the mobile communication device 103 relative to the earth's magnetic field. Similarly, one or more gyroscopes can be included to detect rotational motion of the mobile communication device 103. The gyroscope can be used to determine the spatial rotation of the mobile communication device 103 in three-dimensional space.

One or more biometric sensors can also be included for sensing biometric information relating to a particular user. The mobile communication device 103 can be configured to operate in a health-monitoring mode as a physical safety device by including one or more wellness sensors. Examples of wellness sensors are described in commonly assigned U.S. patent application Ser. No. 10/396,621, filed Mar. 24, 2003, published as US Published Patent Application No. 2004/0015058, which is incorporated herein by reference.

Illustrating by example, a heart monitor can be configured to employ EKG or other sensors to monitor a user's heart rate. The heart monitor can include electrodes configured to determine action potentials from the skin of a user. A temperature monitor can be configured to monitor the temperature of a user. A pulse monitor can be configured to monitor the user's pulse. A moisture detector can be configured to detect the amount of moisture present on a person's skin. The moisture detector can be realized in the form of an impedance sensor that measures impedance between electrodes. As moisture can be due to external conditions, e.g., rain, or user conditions, perspiration, the moisture detector can function in tandem with ISFETS configured to measure pH or amounts of NaOH in the moisture or a galvanic sensor to determine not only the amount of moisture, but whether the moisture is due to external factors, perspiration, or combinations thereof. Information from these biometric sensors can be used to indicate emergencies. For example, if a person's heart rate, pulse, and perspiration all increase suddenly, this can be a sign that the person is under duress from an attack. The communication circuit 306 can transmit an emergency notification to a server complex (101).

An audio capture circuit 312 can be operable with the one or more processors 303. The audio capture circuit 312 can include one or more microphones to receive voice input, voice commands, ambient audio noise in the event of an emergency, and other audio input. A single microphone can be included. Optionally, two or more microphones can be included for selective beam steering. The one or more processors can then select between the first microphone and the second microphone to beam steer audio reception toward the user. The audio capture circuit 312 can record audio to the memory 309 for transmission through the communication circuit 306 to a server complex (101).

In one or more embodiments, a location sensor 311 is included. In one embodiment, the location sensor 311 is a global positioning system device for determining where the mobile communication device 103 is located. (Note that the global positioning system device can also be used to determine the spatial orientation of the mobile communication device 103 in three-dimensional space by determining the change in position of the device relative to the earth.) The global positioning system device can be configured for communicating with a constellation of earth orbiting satellites or a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the global positioning system device autonomously or with assistance from terrestrial base stations, for example with assistance from a cellular communication network or other ground based network, or as part of a Differential Global Positioning System (DGPS), as is well known by those having ordinary skill in the art. While a global positioning system device is one example of a location sensor, it will be clear to those of ordinary skill in the art having the benefit of this disclosure that other location determination devices, such as electronic compasses or gyroscopes, could be used as well.

Figure 4:
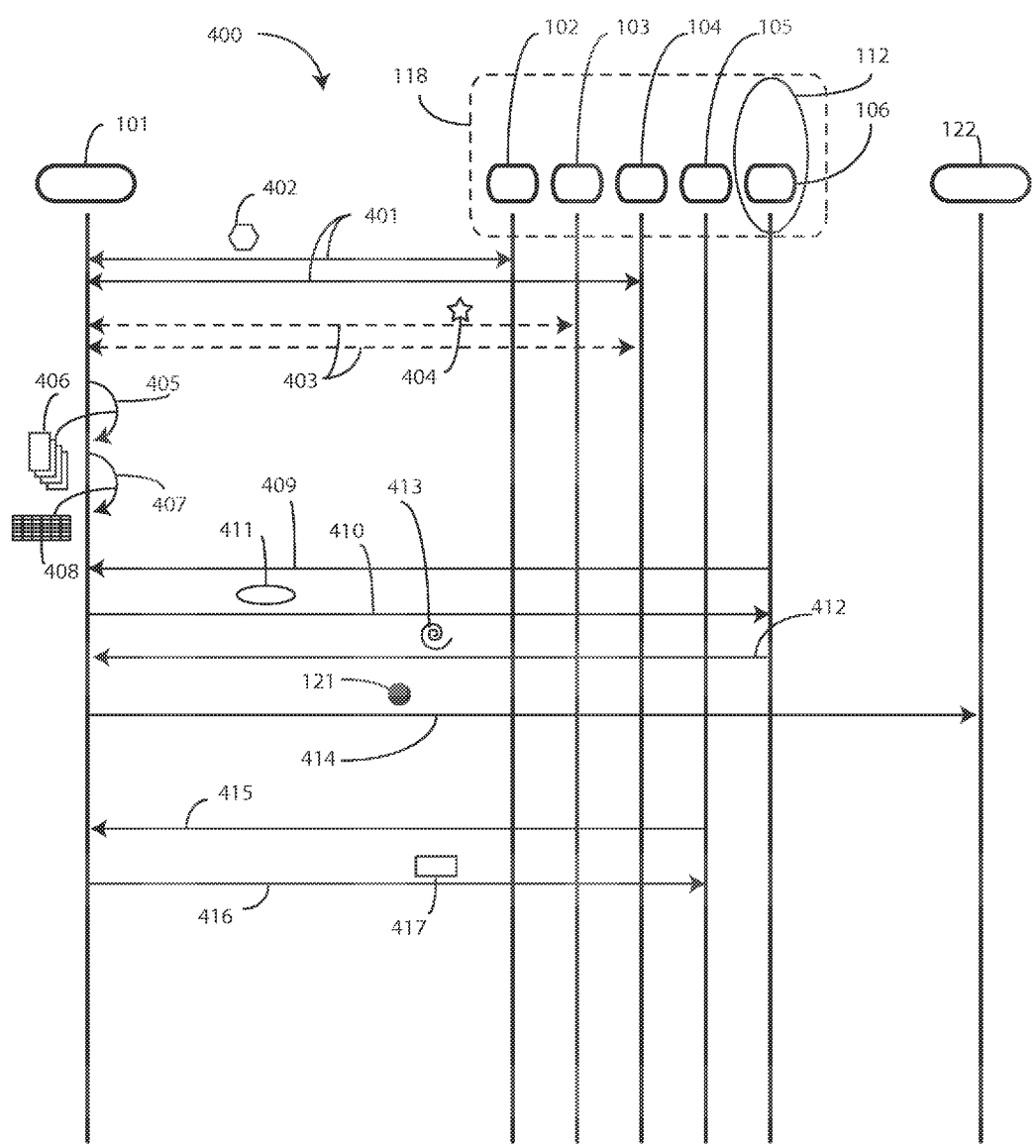
FIG. 4 illustrates explanatory operational steps of a system in accordance with one or more embodiments of the disclosure.

Turning now to FIG. 4, illustrated therein is an operational diagram 400 illustrating how a system (100) configured in accordance with one or more embodiments of the disclosure can operate. Illustrated in the operational diagram 400 are a server complex 101 and a plurality of mobile communication devices 102,103,104,105,106. Additionally, a third party 122, which in this embodiment is emergency personnel, is also shown. In one embodiment, the server complex 101 is to define one or more elevated safety risk regions within a communication network 118, detect when a mobile communication device enters an elevated safety risk region, and when the mobile communication device enters the elevated safety risk region, place the mobile communication device into an emergency mode of operation.

At communication 401, the server complex 101 is to receive instances of activation 402 of an emergency mode of operation from one or more mobile communication devices 102,104 operating in a communication network 118. In one embodiment, these instances of activation 402 are manual activations by users of the mobile communication devices 102,104. In one embodiment, the "triggers" that cause instances of activation 402 include predefined key presses, touchless control, accessory control, and accident detection. Other triggers will be obvious to those of ordinary skill in the art having the benefit of this disclosure. Examples of these triggers will be described in more detail with reference to FIG. 6 below.

At communication 403, the server complex 101 is to receive instances of deactivation 404 of the emergency mode of operation from one or more mobile communication devices 103,104. In one embodiment, these instances of deactivation 404 are manual activations by users of the mobile communication devices 103,104. In one embodiment, the instances of deactivation 404 are defined by a counter-action that brings the mobile communication devices 103,104 back in to a normal mode of operation. For example, where a predefined key press to activate the emergency mode of operation is pressing the volume up key for five seconds, the counter-action may be pressing the volume down key for five seconds. When in the normal operating mode, all the previous settings are retrieved and server complex 101 is notified that the user is back to normal, i.e., non-emergency environment.

At process 405, the server complex 101 clusters 406 the instances of emergency mode activation 402 and the instances of emergency mode deactivation 404 to define 407 one or more elevated safety risk regions 408 within the communication network 118. In one embodiment, the clustering operations comprise k-means clustering, although other clustering techniques, including k-medoids clustering or other clustering can also be used. Clustering operations include methods of vector quantization that can be used for data mining operations. In a clustering operation, the one or more processors of the server complex 101 work to partition N observations into K clusters, where each observation belongs to a defined cluster having a mean, with the mean being nearer than any other cluster mean to the observation. The mean of each cluster serves as an exemplar observation for the cluster. By performing clustering operations, the server complex 101 can partition the communication network into what is known in the art as "Voroni cells." Heuristic algorithms can be employed in conjunction with the clustering operations to efficiently determine the mean of each cluster. Some are similar to expectation-maximization techniques used in iterative refinement of mixtures of Gaussian distributions. The cluster means can then be used to model the data in the form of a matrix of the number of vectors for each cluster. The clusters can be identified as normal or elevated safety risk based upon emergency occurrences therein to define the elevated safety risk regions in one or more embodiments.

At communication 409, the server complex 101 detects a mobile communication device 105 is entering an elevated safety risk region 112. In one embodiment when this occurs, at communication 410 the server complex 101 can transmit commands 411 to place the mobile communication device 105 in the emergency mode of operation. At communication 412, the server complex 101 can detect an emergency incident 413 from the mobile communication device 105. At communication 414, the server complex 101 can transmit an emergency notification 121 in response to detecting the emergency incident 413. In this embodiment, the server complex 101 is transmitting the emergency notification 121 to emergency personnel, shown illustratively as third party 122. However, it should be noted that the server complex 101 can transmit the emergency notification 121 to any of emergency services personnel, one or more contacts stored within the at least one mobile communication device, or combinations thereof.

In one or more embodiments, at communication 415 the server complex 101 can detect that a mobile communication device 106 is about to enter an elevated safety risk region 112. Accordingly, at communication 416 the server complex 101 can transmit a message 417 to the mobile communication device 105. The message 417 may be a warning stating, "Warning, you are entering a really bad part of town." Alternatively, or in conjunction therewith, the message 417 may include one or more preferred routes to—navigate or optionally avoid altogether—the elevated safety risk region 112 as described above.

Figure 5:
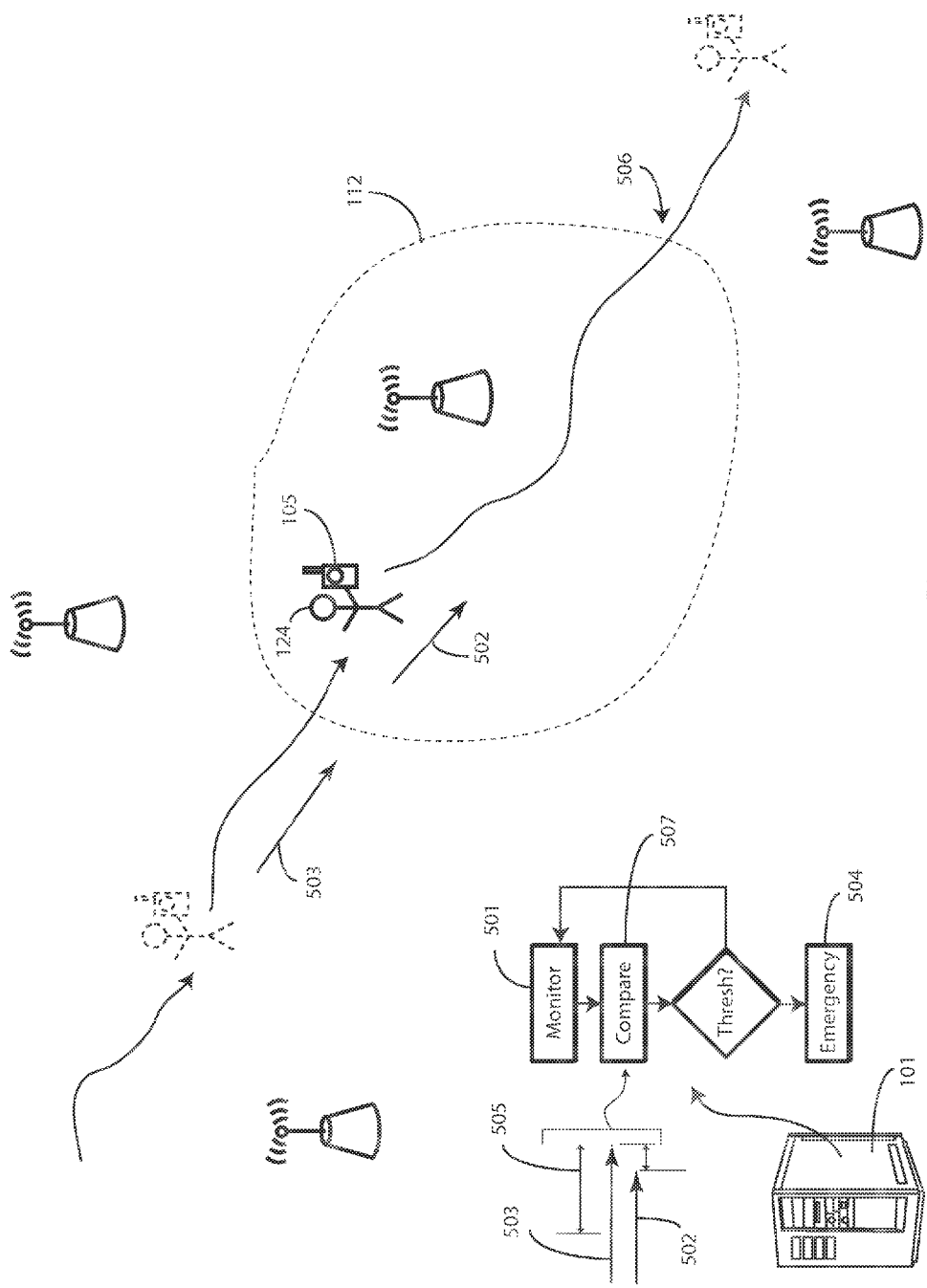
FIG. 5 illustrates explanatory operational steps of a system in accordance with one or more embodiments of the disclosure.

Turning now to FIG. 5, illustrated therein is the server complex 101 monitoring a mobile communication device 105 as it travels through an elevated safety risk region 112. In one embodiment, the server complex 101 can be configured to monitor 501 the mobile communication device 105 solely for the comfort of the user 124. Illustrating by example, the user 124 may manually place the mobile communication device 105 in the emergency mode of operation because they feel unsafe. The server complex 101 can then serve as a virtual escort through the elevated safety risk region 112 through its monitoring activities.

In another embodiment, the server complex 101 is to detect emergency events via its monitoring activities. For example, the server complex 101 can be configured to monitor 501 the mobile communication device 105 while in the elevated safety risk region 112 by comparing 507 motion 502 of the mobile communication device 105 through the elevated safety risk region 112 to a predicted motion 503. In one embodiment, as described above, the predicted motion 503 can be based upon a rate of movement of the mobile communication device 105 prior to entering the elevated safety risk region 112. In another embodiment, the predicted motion 503 can be an average rate of traverse of mobile communication devices through the elevated safety risk region 112. Other methods of determining the predicted motion 503 will be obvious to those of ordinary skill in the art having the benefit of this disclosure. Regardless of how the predicted motion 503 is determined, in one embodiment the server complex 101 is to transmit 504 an emergency notification when the motion 502 of the mobile communication device 105 through the elevated safety risk region 112 differs from the predicted motion 503 by at least a predetermined threshold 505 as described above.

In one or more embodiments, when the mobile communication device 105 exits 506 the elevated safety risk region 112, the server complex 101 is configured to detect this. In one embodiment, when the mobile communication device 105 exits 506 the elevated safety risk region 112 the server complex 101 is to cause the mobile communication device 105 to terminate the emergency mode of operation.

Figure 6:
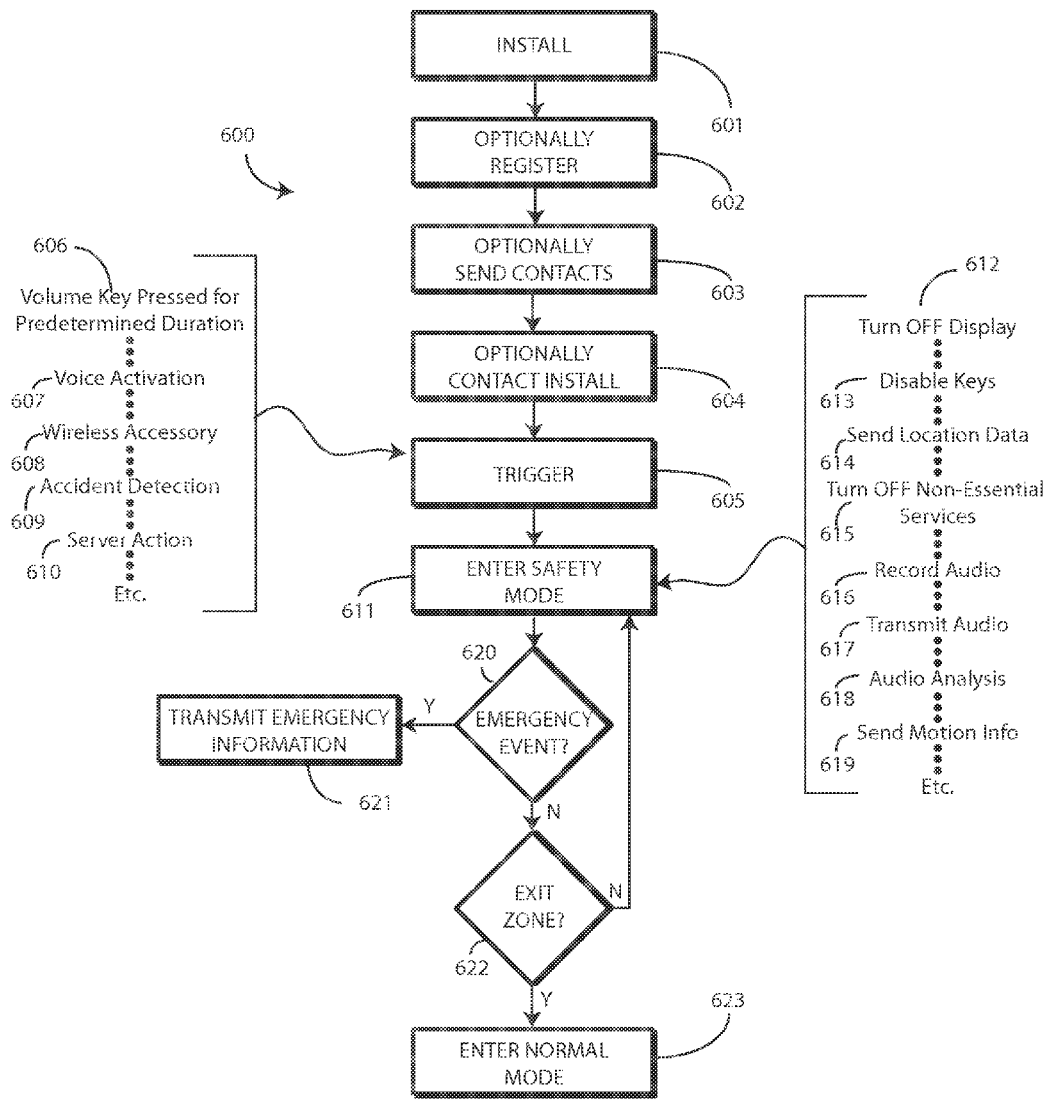
FIG. 6 illustrates an explanatory method for a mobile communication device in accordance with one or more embodiments of the disclosure.

Turning now to FIG. 6, illustrated therein is a method 600 suitable for execution on a mobile communication device in accordance with one or more embodiments. In one or more embodiments the International Mobile Equipment Identity, along with the phone number (if a valid connection is available) can be used used as a primary key interactions and communications between mobile communication device and a server complex. Other primary keys will be obvious to those of ordinary skill in the art having the benefit of this disclosure.

At step 601, the appropriate software is installed on the mobile communication device. In one embodiment, this step 601 includes a set-up process that allows a user to add people from a list of contacts stored within the mobile communication device that should be contacted in the event of an emergency. In one or more embodiments, this list of people is stored as a hidden list within the mobile communication device for safety and privacy purposes. In one or more embodiments, this step 601 also includes a voice training process so that the mobile communication device learns to identify the user from their voice.

At optional step 602, the mobile communication device can register itself with a server complex. In one or more embodiments, step 603 includes transmitting the emergency contact list to the server complex where they are stored. In one embodiment, step 604 can also include transmitting a notification to members of the list of emergency contacts asking them to install any necessary software on their mobile device that is required for emergency communication with the server complex. This latter step 604 is optional.

At step 605, the user actuates a trigger to place the mobile communication device in the emergency mode of operation. Embodiments of the disclosure contemplate that emergency situations frequently arise with a bit of surprise and without warning. It is advantageous if the user is able to trigger the emergency mode of operation quickly and easily. Accordingly, embodiments of the disclosure provide various triggering modes at step 605. The various triggering modes provided ensure that the user has many ways of putting the phone into the emergency mode of operation.

A first trigger is that of a predefined key press, which is illustratively shown as a volume-down key press 606. With this trigger, a user presses the volume down key for a predetermined duration, such as five seconds, to place the mobile communication device into the emergency mode of operation. This trigger assists users who are within the reach of the mobile communication device and quickly can use a single key press to alert the world about the danger about them.

A second trigger is voice activation 607. This trigger is activated through "voice tags" without the user having to physically manipulate the mobile communication device. This trigger is particularly useful if the user's hands are not available. For example, in a kidnapping the user's hands may have been tied. These voice tags can be any language. In one embodiment, the phrase for which the mobile communication device responds and moves into the emergency mode of operation is user configurable. This trigger can also be useful when the mobile communication device is disposed within a bag outside the reach of the user's hands. At those times, attempting to physically manipulate the mobile communication device may prove more dangerous since an adversary may commandeer it.

A third trigger is accessory activation 608. A wireless accessory, such as a wearable device or headset that is in communication with the mobile communication device can be used to activate the emergency mode of operation in one or more embodiments. This trigger is useful for situations when an adversary has commandeered the mobile communication device. The user can still activate the emergency mode of operation wirelessly.

A fourth trigger is accident detection 609. For example, by tracking and detecting the rate of change of deceleration (or other parameter) of the mobile communication device, a server complex can detect that accident happened. In one or more embodiments, such sudden deceleration would cause the mobile communication device to enter the emergency mode of operation.

A fifth trigger is that of server activation 610. This has been largely described above. A server complex can detect the mobile communication device entering an elevated safety risk region. In one or more embodiments, before the user is about to enter the elevated safety risk region, user gets alerted about the same. Other triggers will be obvious to those of ordinary skill in the art having the benefit of this disclosure.

Regardless of trigger, at step 611 the mobile communication device enters the emergency mode of operation. At this step 611, a variety of actions can occur. It should be noted that these actions can be performed in any combination.

In one embodiment, when the emergency mode of operation is activated a display of the mobile communication can be deactivated 612. This causes the display to effectively turn blank. In one embodiment, one or more keys of the mobile communication device can also be deactivated 613. This causes the mobile communication device to be non-responsive to any key actions. The combination of deactivation of the display and deactivation of the keys makes the mobile communication device look as if the battery died to an attacker. Moreover, the latter works to ensure that the mobile communication device cannot be turned OFF using conventional techniques, such as a long press of the power key.

Meanwhile, in one embodiment the mobile communication device then transmits location information 614 to a server complex. The mobile communication device can, where one or more processors are executing one or more applications, stop at least one application 615 or otherwise turn off non-essential services running on the device. These operations help to conserve energy stored in a battery of the mobile communication device. However, if a situation arises that the battery level is going to a dangerously low level such that communication with a server complex cannot continue, a notification can be sent to the server complex of this condition. Such a notification can keep friends and family aware that the battery charge became depleted.

Where the mobile communication device includes an audio recording or capture circuit, the emergency mode of operation can activate the audio recording or capture circuit 616 to record audio. Audio recordings can be stored in the memory of the mobile communication device. In one embodiment, non-essential information stored in memory can be purged so that sufficient space is allotted for the audio recordings. In effect, the mobile communication device turns into an audio "black box" to capture recordings of what is happening in the surrounding environment.

In one or more embodiments, the mobile communication device can transmit captured audio 617 from the audio recording circuit to the server complex when the mobile communication device is in the emergency mode of operation. In one or more embodiments, the transmission of captured audio occurs periodically.

Processors of the mobile communication device can optionally perform audio identification analysis on the captured audio to identify a source of the captured audio. The source may be a user, or an attacker if a database of known vigilantes exists. In one embodiment, based on the voices being recorded when the emergency incident is occurring, an attempt can be made to match the voice with the voice of any of the people in the user's contact list. For this purpose, the voice samples of all the contacts can optionally be stored in the mobile communication device. When any voice is matched, the details of that contact can be included in a message transmitted to the server complex to provide an indication as to who else is present in the situation along with the victim.

The mobile communication device can also transmit motion information 619. This can be used to detect sudden changes in motion, impact, and other characteristics that may indicate an emergency event. In one embodiment, when in the emergency mode of operation, one or more sensors can be used to identify the physical handling of the mobile communication device. In addition to location and other sensor information, the server complex can be informed about the physical condition of the mobile communication device itself. Incidents like attempt to switch OFF the mobile communication device, throwing the mobile communication device, varying the physical position of the mobile communication device with respect to user can each be monitored.

The method 600 determines whether an emergency event occurs at decision 620. In one or more embodiments, when this occurs the method 600 can attempt a confirmation process to confirm that the emergency is indeed an emergency. This helps to prevent false positives in the emergency detection process. For example, when the method 600 determines an emergency event is occurring at decision 620, the method 600 may send a message to the mobile communication device prompting the user to confirm whether the detected event is actually an emergency. The message may ask the user, "Is this a real emergency?" or "What is your emergency?" This prompting can be silent, via text entry, or can be audible, requesting a voice reply. The latter is advantageous where the user of the mobile communication device is injured and cannot type a response. Where an emergency event occurs, step 621 can notify a third party in response to recognizing the emergency event.

The mobile communication device can be detected leaving the elevated safety risk region at decision 622. As described above, this can cause the mobile communication device to exit the emergency mode of operation at step 623. All previous settings can be retrieved and the server complex can be notified that the user is back to a normal situation from emergency. Optionally, the server can then alert all the contacts that the user has come out of emergency situation.

Figure 7:
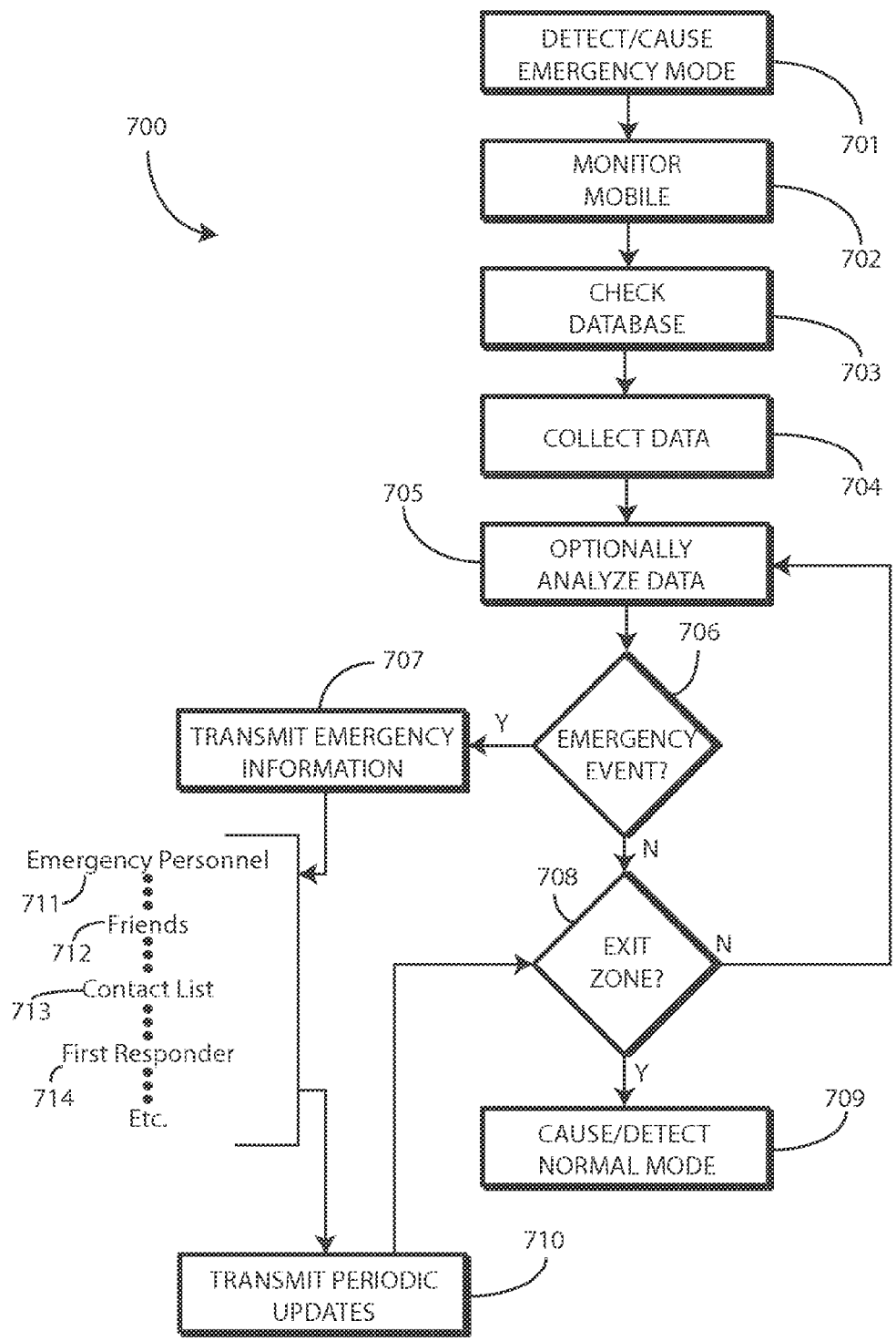
FIG. 7 illustrates an explanatory method for a server complex in accordance with one or more embodiments of the disclosure.

Turning now to FIG. 7, illustrated therein is a method 700 suitable for execution on a server complex in accordance with one or more embodiments. The method 700 allows one or more servers of the server complex to monitor a location of a mobile communication device relative to one or more elevated safety risk regions defined within the server complex, detect the mobile communication device entering an elevated safety risk region, and/or cause the mobile communication device to enter an emergency mode of operation while the mobile communication device is within the elevated safety risk region.

At step 701, the method 700 detects that one or more mobile communication devices is operating in the emergency mode of operation. In one or more embodiments, this step 701 includes monitoring a location of a mobile communication device relative to one or more elevated safety risk regions defined within the server complex and causing the mobile communication device to enter the emergency mode of operation when the mobile communication device is near, or is entering, the elevated safety risk region.

At step 702, the method 700 monitors the mobile communication device while operating in the emergency mode of operation. At step 703, the method 700 optionally references a database of registered users, their corresponding contacts, and/or emergency incidents. Step 703 can continue throughout the method 700 during the remaining steps. In one embodiment, the database includes a listing of all the registered users and the incidents that have been detected. Accordingly, the database can be used to record emergency alerts sent by users, or to provide periodic updates to third parties. Additionally, the database can be used to record all emergency or safety incidents in a particular area.

At step 704, the method 700 receives data from the mobile communication device. This step 703 can include receiving one or more of voice data, location data, or motion data from the mobile communication device while in the emergency mode of operation. It should be noted that as more users opt-in to the system, step 703 can result in more information in the database from which to draw upon when defining the elevated safety risk regions. Accordingly, the definitions coming from the clustering processes should become refined through iteration. In one or more embodiments, at step 704 a server complex receives continual or periodic or intermittent data from the mobile communication device and/or alerts transmitted by a user. The alerts can be transmitted by a messaging protocol or other wireless communication protocol.

At step 705, the method 700 can optionally analyze the data received at step 704. For example, this step 705 can include recognizing an emergency event from one or more of the voice data, the location data, or the motion data. In one or more embodiments, step 705 can include performing voice identification analysis on received audio data from the mobile communication device to identify the user, friends or people around the user, or even attackers or adversaries. In one or more embodiments, step 705 can include performing voice identification analysis on a plurality of messages received from a single mobile communication device, or a plurality of messages received from multiple mobile communication devices to determine whether a common attacker is present in the plurality of messages or whether an attacker identified in a plurality of messages is part of a gang. Other types of data analysis will be obvious to those of ordinary skill in the art having the benefit of this disclosure.

At decision 706, the method 700 determines whether an emergency event has occurred. This can be by way of data transmission from the user, analysis performed in optional step 705, or by other methods. Where an emergency is detected, the method 700 can notify a third party at step 707 in response to recognizing the emergency event. Examples of third parties include emergency personnel 711, friends 712 of a user, members 713 from the user's contact list, emergency first responders 714 such as military, National Guard, or specialized personnel, or other third parties. Still more third parties will be obvious to those of ordinary skill in the art having the benefit of this disclosure.

In addition to notifying the third party, step 707 can optionally include transmitting data to the third party. For example, in one embodiment a uniform resource locator will be sent to the third party that points to received data that can provide a trail of events associated with the emergency incident. In one or more embodiments the data can include timestamp data, live audio recording data, location data, address, address data, or annotated maps directing the third party to the victim to assist the third party in analyzing the situation and providing help and easy tracking of the victim. Where, for example, a mobile communication device transmits data at step 707 through a series of messages, this set of messages can provide a trail of events that a third party can use to piece together a time-lapse set of facts concerning the incident. In effect, the series of messages form a "bread crumb" trail that allow the third party to better assist a victim. Accordingly, in one or more embodiments the method 700 can optionally send updates as necessary to the third parties at step 710.

Where no emergency event is detected at decision 708, the method moves to decision 708 to determine whether the mobile communication device has left the elevated safety risk region. Where it has not, the method 700 keeps monitoring the mobile communication device. Where the mobile device is leaving or has left the elevated safety risk region, the method 700 can optionally return the mobile communication device to the normal operating mode at step 709.

Figure 8:
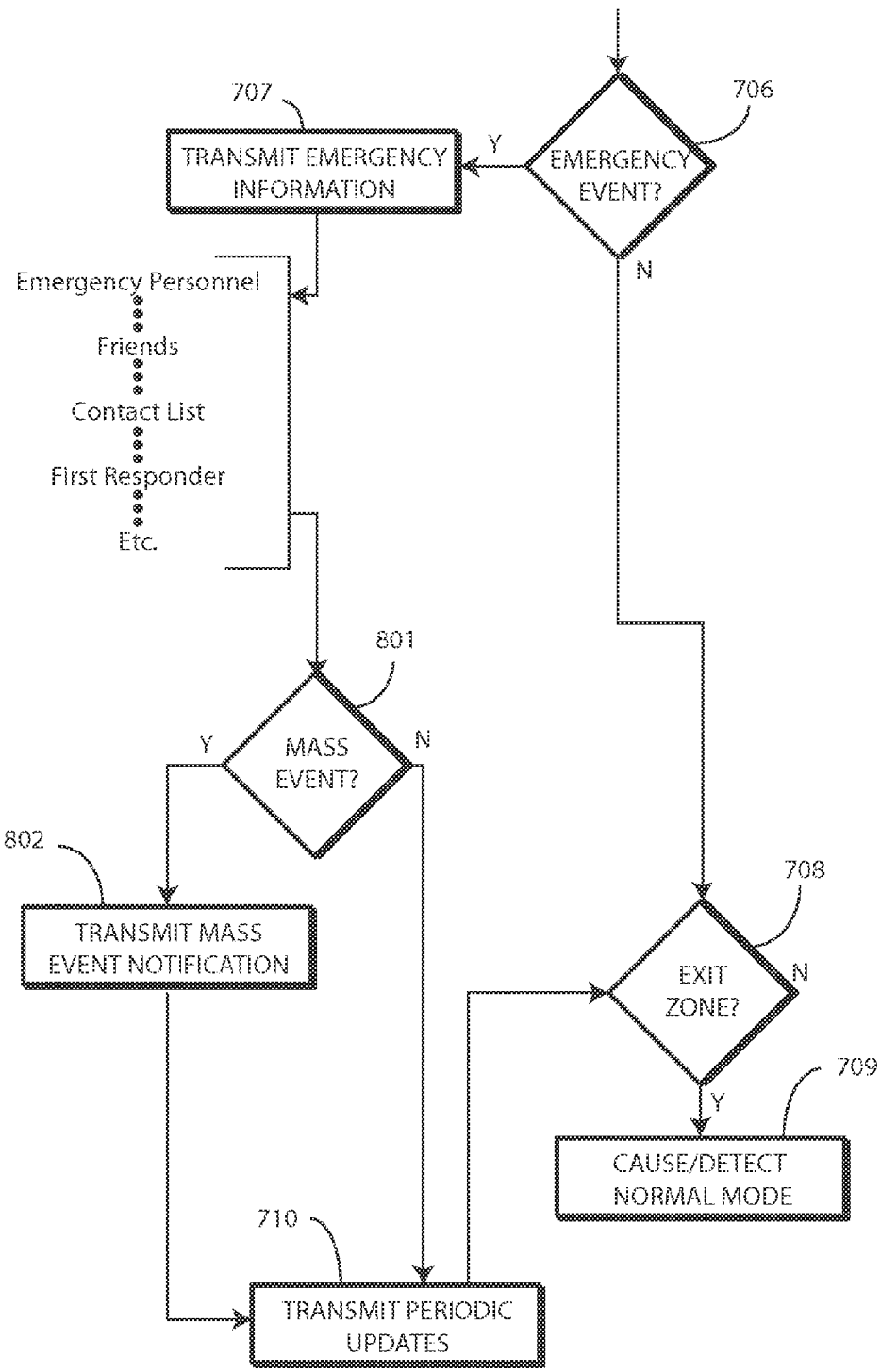
FIG. 8 illustrates another explanatory method for a server complex in accordance with one or more embodiments of the disclosure.

Embodiments of the disclosure can also be used to detect mass emergency events. Turning now to FIG. 8, illustrated therein is one explanatory method 800 of doing this. Others will be obvious to those of ordinary skill in the art having the benefit of this disclosure. Decision 706 and step 707 are the same as described above with reference to FIG. 7. The same is true with decision 708, and steps 709,710.

At decision 801, the method 800 determines whether a mass emergency event has occurred. In one embodiment, this can be done by determining whether an amount of users are sending emergency notifications exceeds a predetermined threshold. In another embodiment, this can be accomplished by detecting a number of emergencies within a predefined geographic region that exceed a predetermined threshold. In one or more embodiments, based on the number of users in a particular area that are calling for emergency help and the pattern of reports, the method detects a mass emergency at decision 801. Example situations that qualify as mass emergencies include natural calamities, earthquakes, terrorist attacks, train accidents, riots, and other similar catastrophic events.

At step 802, the method 800 transmits a mass emergency event notification. In one or more embodiments, the mass emergency event notification can include a map identifying a particular area at which the mass emergency event is occurring, optionally with geographic coordinates pointing to the event. This information can be used in one or more embodiments to alert people in that area. The information can also be used by emergency response teams and emergency warning systems in one or more embodiments.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A server complex, comprising:
   one or more memory devices;
   one or more processors operable with the one or more memory devices; and
   a communication device operable with the one or more processors;
   the one or more processors to:
   receive, through the communication device, instances of activation of a device emergency mode of operation from one or more mobile communication devices operating in a communication network, wherein the activation of the device emergency mode of operation includes changing a previous setting on the one or more mobile communication devices to cause the one or more mobile communication devices to operate differently from a device normal mode of operation, wherein operating differently from the device normal mode operation includes changing an operation of the one or more mobile communication devices;
   receive, through the communication device, instances of deactivation of the device emergency mode of operation from the one or more mobile communication devices, wherein the deactivation of the device emergency mode of operation includes restoring the previous setting on the one or more mobile communication devices to cause the one or more mobile communication devices to operate in the device normal mode of operation again;
   cluster the instances of device emergency mode activation and instances of device emergency mode deactivation to define one or more elevated safety risk regions within the communication network; and
   transmit, to at least one other mobile communication device, a command to place the at least one other mobile communication device in the device emergency mode of operation upon detecting the at least one other mobile communication device entering the one or more elevated safety risk regions.

2. The server complex of claim 1, the one or more processors to detect, with the communication device, an emergency incident from the at least one other mobile communication device and to transmit an emergency notification in response to detecting the emergency incident.

3. The server complex of claim 2, the one or more processors to transmit the emergency notification to one of emergency services personnel, one or more contacts stored within the at least one other mobile communication device, or combinations thereof.

4. The server complex of claim 1, the one or more processors to monitor the at least one other mobile communication device while in the one or more elevated safety risk regions by comparing motion of the at least one other mobile communication device through the one or more elevated safety risk regions to a predicted motion.

5. The server complex of claim 4, the one or more processors to transmit an emergency notification when the motion of the at least one other mobile communication device through the one or more elevated risk regions differs from the predicted motion by at least a predetermined threshold.

6. The server complex of claim 4, the predicted motion based upon a rate of movement of the at least one other mobile communication device prior to entering the one or more elevated safety risk regions.

7. A system, comprising:
   a server complex; and
   one or more mobile communication devices operating in a communication network and in communication with the server complex, the server complex comprising one or more processors to:
   receive instances of activation of a device emergency mode of operation from the one or more mobile communication devices, wherein the activation of the device emergency mode of operation includes changing a previous setting on the one or more mobile communication devices to cause the one or more mobile communication devices to operate differently from a device normal mode of operation, wherein operating differently from the device normal mode operation includes changing an operation of the one or more mobile communication devices;
   receive instances of deactivation of the device emergency mode of operation from the one or more mobile communication devices, wherein the deactivation of the device emergency mode of operation includes restoring the previous setting on the one or more mobile communication devices to cause the one or more mobile communication devices to operate in the device normal mode of operation again;
   define one or more elevated safety risk regions within the communication network by clustering the instances of device emergency mode activation and instances of device emergency mode deactivation;
   detect when at least one other mobile communication device enters an elevated safety risk region; and when the at least one other mobile communication device enters the elevated safety risk region, transmit a command to place the at least one other mobile communication device into the device emergency mode of operation.

8. The system of claim 7, the at least one other mobile communication device comprising a display, the device emergency mode of operation to deactivate the display.

9. The system of claim 7, the at least one other mobile communication device comprising an audio recording circuit, the device emergency mode of operation to activate the audio recording circuit.

10. The system of claim 9, the at least one other mobile communication device to transmit captured audio from the audio recording circuit to the server complex when the at least one other mobile communication device is in the device emergency mode of operation.

11. The system of claim 10, the one or more processors of the server complex to perform audio identification analysis on the captured audio to identify a source of the captured audio.

12. The system of claim 10, the at least one other mobile communication device to transmit the captured audio periodically.

13. The system of claim 7, the at least one other mobile communication device comprising one or more device processors to execute one or more applications, the device emergency mode of operation to stop at least one application.

14. The system of claim 7, the one or more processors to detect the at least one other mobile communication device entering the elevated safety risk region and to transmit a warning message to the at least one other mobile communication device.

15. The system of claim 7, the server complex to:
detect when the at least one other mobile communication device exits the elevated safety risk region; and
when the at least one other mobile communication device exits the elevated safety risk region, cause the at least one other mobile communication device to terminate the device emergency mode of operation.

16. A method, comprising:
performing, with one or more processors of a server complex:
receiving instances of activation of a device emergency mode of operation from one or more mobile communication devices, wherein the activation of the device emergency mode of operation includes changing a previous setting on the one or more mobile communication devices to cause the one or more mobile communication devices to operate differently from a device normal mode of operation, wherein operating differently from the device normal mode operation includes changing an operation of the one or more mobile communication devices;
receiving instances of deactivation of the device emergency mode of operation from the one or more mobile communication devices, wherein the deactivation of the device emergency mode of operation includes restoring the previous setting on the one or more mobile communication devices to cause the one or more mobile communication devices to operate in the device normal mode of operation again;
clustering the instances of device emergency mode activation and instances of device emergency mode deactivation to define one or more elevated safety risk regions;
monitoring a location of at least one other mobile communication device relative to the one or more elevated safety risk regions;
detecting the at least one other mobile communication device entering an elevated safety risk region; and
transmitting a command to cause the at least one other mobile communication device to enter the device emergency mode of operation while the at least one other mobile communication device is within the elevated safety risk region.

17. The method of claim 16, the performing further comprising receiving one or more of voice data, location data, or motion data from the at least one other mobile communication device while in the device emergency mode of operation.

18. The method of claim 17, the performing further comprising recognizing an emergency event from one or more of the voice data, the location data, or the motion data.

19. The method of claim 18, the performing further comprising notifying a third party in response to recognizing the emergency event.

20. The server complex of claim 1, wherein placing the at least one other mobile communication device in the device emergency mode of operation includes changing the operation of the at least one other mobile communication device by suspending at least one user interface functionality.

21. The server complex of claim 1, wherein placing the at least one other mobile communication device in the device emergency mode of operation includes changing the operation of the at least one other mobile communication device by adding at least one user interface functionality.

22. The system of claim 7, wherein to place the at least one other mobile communication device into the device emergency mode of operation includes changing the operation of the at least one other mobile communication device by suspending at least one user interface functionality.

23. The system of claim 7, wherein to place the at least one other mobile communication device into the device emergency mode of operation includes changing the operation of the at least one other mobile communication device by adding at least one user interface functionality.

24. The method of claim 16, wherein to cause the at least one other mobile communication device to enter the device emergency mode of operation includes changing the operation of the at least one other mobile communication device by suspending at least one user interface functionality.

25. The method of claim 16, wherein to cause the at least one other mobile communication device to enter the device emergency mode of operation includes changing the operation of the at least one other mobile communication device by adding at least one user interface functionality.

* * * * *